United States Patent [19]
Blakely

[11] Patent Number: 5,959,818
[45] Date of Patent: Sep. 28, 1999

[54] METHOD AND APPARATUS FOR SELF-POWERED THREE-PHASE SENSING TO DETERMINE TRUE RMS CURRENT VALUES WITH SEPARATE BURDENS FOR EACH CURRENT TRANSFORMER

[75] Inventor: John H. Blakely, Asheville, N.C.

[73] Assignee: Eaton Corporation, Cleveland, Ohio

[21] Appl. No.: 08/885,980

[22] Filed: Jun. 30, 1997

[51] Int. Cl.$^6$ .................................................. H02H 3/00
[52] U.S. Cl. .......................................... 361/93; 361/102
[58] Field of Search .......................... 361/93–97, 102, 361/76, 42, 44, 47–48

[56] References Cited

U.S. PATENT DOCUMENTS

| | | | |
|---|---|---|---|
| 2,202,998 | 6/1940 | Seeger et al. ............................ | 318/706 |
| 3,604,982 | 9/1971 | McDonald ................................ | 361/46 |
| 3,614,533 | 10/1971 | Douglas et al. ......................... | 361/44 |
| 3,875,464 | 4/1975 | Gary et al. ................................ | 361/31 |
| 4,574,229 | 3/1986 | Kim ........................................ | 318/788 |
| 4,683,513 | 7/1987 | Miller ...................................... | 361/76 |
| 4,683,515 | 7/1987 | Beihoff et al. ........................... | 361/106 |
| 4,819,125 | 4/1989 | Arinobu et al. .......................... | 361/97 |
| 4,967,304 | 10/1990 | Dougherty ............................... | 361/31 |
| 5,038,246 | 8/1991 | Durivag, III ............................. | 361/93 |
| 5,220,478 | 6/1993 | Innes et al. .............................. | 361/93 |
| 5,239,438 | 8/1993 | Echtler .................................... | 361/44 |
| 5,450,268 | 9/1995 | Phillips et al. ........................... | 361/93 |
| 5,506,743 | 4/1996 | Phillips .................................... | 361/85 |
| 5,777,835 | 7/1998 | Innes ....................................... | 361/93 |

*Primary Examiner*—Jeffrey Gaffin
*Assistant Examiner*—Michael J. Sherry
*Attorney, Agent, or Firm*—Whyte Hirschboeck Dudek; Timothy J. Ziolkowski

[57] ABSTRACT

A method and apparatus is disclosed for three phase sensing of a polyphase distribution system to provide true RMS signal monitoring capabilities. Each current transformer is provided with a rectifier and a separate burden to not only provide accurate signal representation of the true RMS currents in each phase, but also provide a DC voltage supply to thereby self-power the circuit. Two configurations are disclosed, one in which two CTs sense all three phases. In this configuration, two phases of the three phase system are used as a single primary winding in each current transformer such that each current transformer produces a voltage representation of a sum of two phase currents. A second configuration discloses the use of a current transformer for each phase. In both embodiments, by providing a separate burden and rectifier for each CT, true RMS signal characteristics can be extracted from the produced discrete signals, while at the same time providing a DC voltage supply for self-powering the circuit.

13 Claims, 2 Drawing Sheets

METHOD AND APPARATUS FOR SELF-POWERED THREE-PHASE SENSING TO DETERMINE TRUE RMS CURRENT VALUES WITH SEPARATE BURDENS FOR EACH CURRENT TRANSFORMER

CROSS-REFERENCES TO RELATED APPLICATIONS

The present invention is related to U.S. application Ser. No. 08/885,551, now U.S. Pat. No. 5,777,835 and to U.S. application Ser. No. 08/831,621 now U.S. Pat. No. 5,815,357.

BACKGROUND OF THE INVENTION

The present invention relates generally to phase sensing of alternating currents in a polyphase distribution system, and more particularly, to a method and apparatus for three phase sensing using a separate burden for each current transformer.

Current transformers (CTs) are used for sensing AC electrical currents in load control and in protection devices. For example, CTs are used in sensing electrical currents through contactors, motor starters and controllers, circuit breakers, monitors and analyzers, and in general, electrical distribution systems. In many such applications, these products are polyphase, or more particularly three-phase, and generally require a CT for each phase.

Most modern prior art attempts at monitoring overload and fault conditions in a load supplied by a multiphase, or polyphase power supply, use a current transformer for each separate phase of the three-phase power distribution system. For example, U.S. Pat. No. 4,967,304 discloses a digital circuit interrupter applicable for use on a three-phase power distribution system wherein a separate current transformer is required for each separate phase of the distribution system. One attempt at using two current transformers to detect phase failure and overload is disclosed in U.S. Pat. No. 2,202,998. However, the two CTs monitor only two of the three phases, and the third phase is only indirectly monitored. That is, a failure or overload on the unmonitored third phase is detected by the reaction it has on the two monitored phases. The third phase itself is not monitored. Further, a phase loss in the unmonitored phase will go undetected until the two CTs detect the resulting higher currents in the two monitored phases, which may be too late to protect modern loads having very tight thermal tolerances.

In monitoring the secondary windings of the CTs, the prior art has commonly used a single burden resistor for combining and averaging a representation value for the currents in each phase. In such systems, it is not possible to determine the true RMS value for each current in each phase. By combining the currents in a lump sum in a single burden, it is not possible to detect an out of balance condition in a load without monitoring some other characteristic. In other words, in a three phase load drawing 1 amp RMS in each of the three phases, a single burden resistor will provide a 2.7 amp average signal under a normal, balanced operation. However, in an out of balance condition where the load is drawing 1 amp in one phase, 0.5 amps in a second phase, and 1.5 amps in a third phase, the single burden system has no way of detecting that one phase is three times higher than the other and the single burden resistor will continue to provide a 2.7 amp average signal indicating a balanced condition.

Therefore, in such systems it is necessary to monitor some other condition, such as voltage ripple on burden, which merely gives an approximation of the significant difference in currents, and adds complexity and expense to such systems.

One attempt at approximating an RMS current for each phase is disclosed in U.S. Pat. No. 5,450,268 for which is said to approximate the true RMS value within plus or minus 5%. This system approximates the RMS line current by determining a peak value of the current and combining it with a determined average value of the current in each phase. However, in this system since the negative side of each rectifier is connected to ground and the burden is taken with reference to the positive side of the rectifier, it is unable to provide a DC voltage supply to self-power the circuit. Further, this system does not provide a signal capable of providing the true RMS, but merely an approximation of the true RMS signal according to empirical data.

Other prior art attempts at tracking RMS current values include placing a single burden resistor in the return or common path to produce a signal proportional to the sum of the three phase currents so as to avoid having to consider the current drawn by the circuit itself. The problem with such a configuration is that the contributions of individual phases is unknown. For example, if three CTs each contributed a 1 amp RMS current, the total current in a single collection resistor would be 2.7 amp average. Conversely, whenever the value in the single collection resistor would be 2.7 avg., the circuit would assume each phase current to be equal to 1 amp RMS and the avg. $I^2$ total would be 7.3. However, if the contributions were actually 0.5, 1.5, and 1, the sum would still be 2.7, but the actual avg. $I^2$ total would 7.5. This represents only a 3% increase in the $I^2$ total, yet one phase is operating at 150% current. Therefore, single burden systems merely average the $I^2$ total and are often in error and require some other means for determining out of phase or phase loss conditions.

In a self-powered application, the circuit must not only generate a voltage to operate the circuit, but also a signal that accurately represents the actual current to be measured. Therefore, it would desirable to have a method and apparatus for self-powered three phase sensing capable of determining true RMS current values that solves the aforementioned problems. It would be further advantageous to provide such a method and apparatus with only two current transformers.

SUMMARY OF THE INVENTION

The present invention accomplishes the foregoing by providing a method and apparatus for monitoring all three phases of a polyphase distribution system in which a separate burden is provided for each current transformer for providing true RMS signal representations. The present invention includes a self-powering feature supplying a positive DC power supply and is applicable in either a 2 CT or 3 CT configuration. In the 2 CT configuration, the present invention reduces the costs associated with the current transformers by approximately ⅓ from that of most commercially available overload devices using 3 such CTs, and reduces the overall cost of such devices by approximately 10%. In either of the configurations, a signal is provided that is representative of the true RMS value of each current in the polyphase distribution system through the use of a separate burden for each CT.

In accordance with one aspect of the invention, a device for monitoring a polyphase distribution system connected to a load, for example a motor, has at least two current transformers in operable association with each phase of the polyphase distribution system and at least two rectifiers, each rectifier connected to a respective current transformer. The device further includes at least two burden resistors, each connected in a return path of a respective rectifier such that each provides a respective discrete signal representative of RMS current in each phase.

In the two current transformer configuration, each current transformer monitors two phases of the three phase system. In this manner, through appropriate signal processing, an RMS signal representation for each phase of the polyphase distribution system can be produced. If applied to an overload protection device, an irregularity can produce a trip signal to open a set of contacts in the polyphase distribution system for interrupting current flow therethrough.

In a three current transformer configuration, a rectifier and a burden are supplied for each current transformer such that a respective discrete signal is provided for each phase representative of the true RMS value of the current in each phase of the polyphase distribution system. Since the burden resistors in the three current transformer configuration are connected in a return path of each rectifier, the positive output from the rectifier can be used in association with a voltage regulator to provide a DC power supply to self-power the circuit. In other words, no external DC power supply is required as is necessary in the aforementioned prior art.

The resulting RMS signal representations can be used in any conventional monitoring device to monitor each of the three phases in the polyphase distribution system. The device may produce a trip signal when any one of the RMS representative signals are not within a predefined range, or a comparison of the magnitudes can be made to trip on any phase loss, unbalance, or load jam. For example, a thermal overload relay can be used in conjunction with the produced RMS representative signals wherein the RMS values are integrated to create a total heat accumulation value. After subtracting a cooling factor, a net heat accumulated value is produced which can then be compared to a set point. A trip signal is produced when the net heat exceeds the set point. In this manner, by providing an RMS value for the currents in each phase, all three phases can be protected. The present invention is equally applicable to such monitoring devices as meters and other measuring or monitoring apparatus.

In accordance with another aspect of the invention, a method of monitoring a polyphase system and providing both DC power and respective discrete signals representative of each phase in the polyphase distribution system is also disclosed. The method includes sensing an AC electrical current in each phase of the polyphase distribution system, rectifying the AC electrical current for each phase, and providing a DC power supply from the rectified AC electrical current. The method next includes providing at least two distinct respective discrete signals having RMS representative characteristics of each phase of the polyphase distribution system from each of the rectified AC electrical currents. The step of sensing can be further defined to sense three phases with two current sensors and further include the step of processing two distinct respective discrete signals to produce three discrete signals, each containing RMS characteristic information for one phase of the polyphase distribution system. In an overload protection application, the method can also include monitoring each of the three discrete signals for irregularities and interrupting power in the polyphase distribution system in response to any monitored irregularity in any one of the phases.

The present invention therefore provides a three phase sensor with separate burdens for each current transformer to provide discrete signals from which the true RMS current can be determined, while at the same time providing a self-powering feature which does not detract from the capabilities of determining the true RMS values. A three CT configuration is shown in which a separate CT is provided for each phase of a three phase distribution system. A more cost effective two CT configuration is also disclosed in which each CT is coupled to two phases of the three phase system. A single CT sensing phase currents in phases A and B will provide a phase representation -C, and another CT sensing currents and phases B and C will provide a phase representation -A. As is known, adding phase -A with phase -C will provide a representation for phase B. In this manner, a true RMS signal value for each of the phases can readily be determined in a microprocessor.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE INVENTION

The present invention is described herein in connection with a motor, a motor starter, and a thermal overload relay. However, it must be understood that the application of the invention in this configuration is for illustration only, and it will be appreciated by those skilled in the art that the present invention is equally applicable to any load connected to a polyphase distribution system.

Figure 1:
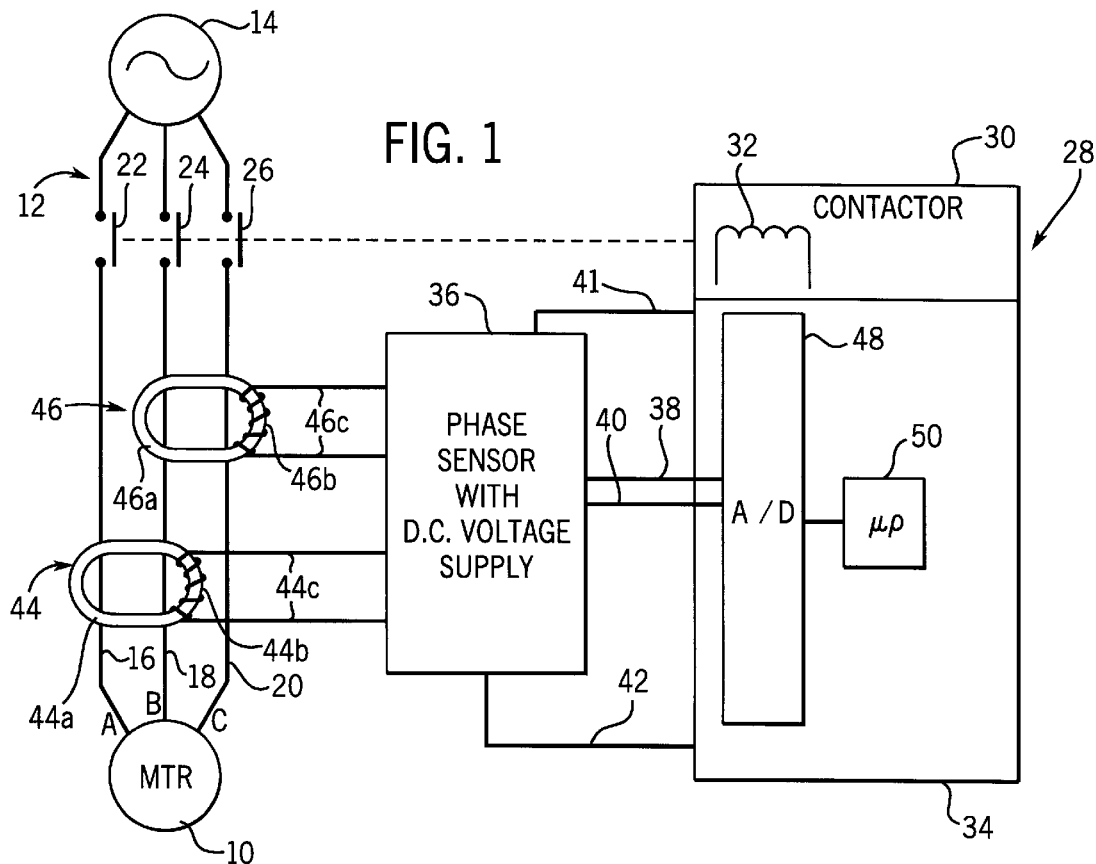
FIG. 1 is a schematic diagram of a motor starter incorporating the present invention.

Referring to FIG. 1, an electric motor 10 is energized by a polyphase AC distribution system 12 connected to a power source 14. The polyphase AC distribution system 12 has three-phase conductors 16, 18, and 20 interruptible by a switch having contacts 22, 24, and 26 connecting the power source 14 to the motor 10 through the three-phase conductors 16, 18, and 20.

A motor starter 28 includes a contactor 30 incorporating a coil 32 which when energized, closes the switching contacts 22, 24, and 26 in conductors 16, 18, and 20 to connect the motor 10 to the power source 14. The motor starter 28 also has an overload relay 34 to receive analog signals representative of phase currents and to energize the contactor 30.

In a first embodiment of the present invention, a phase sensor with DC voltage supply 36 is connected to two current transformers 44 and 46, each in operable association with two legs of the polyphase AC distribution system 12. Each of the current transformers 44, 46 include a toroidal core 44a, 46a and a secondary winding 44b, 46b, respectively. The conductors 16, 18, and 20 pass through the toroids 44a, 46a to form the primary winding of the current transformer. In the embodiment of FIG. 1, conductors 16 and 18 pass through toroid 44a to form the primary winding of current transformer 44, and conductors 18 and 20 pass through toroid 46a to form the primary winding of current transformer 46. The secondary winding 44b generates analog signals representative of the currents in the associated conductors 16 and 18, and the secondary winding 46b generates analog signals representative of the currents in the associated conductors 18 and 20. The analog signals are relayed to the phase sensor with DC voltage supply 36 via leads 44c and 46c, respectively.

In this manner, each current transformer 44 and 46 monitors two phases in the polyphase system 12 to produce a signal representation of a sum of the two phases monitored. For example, current transformer 44 monitors phases A and B on conductors 16 and 18 and produces a representation of phase -C as a result of the vector addition in the current transformer on leads 44c to phase sensor 36. Similarly, current transformer 46 monitors phases B and C on conductors 18 and 20 to produce a signal representation of phase -A from the vector summation of B and C in current transformer 46, and supplies that result on leads 46c to the phase sensor 36.

In this two CT configuration, the phase sensor 36 can then supply two discrete signal representations in analog form on lines 38 and 40 to analog-to-digital (A/D) convertor 48 in overload relay 34 to digitize the signal representations. As will be described in more detail with reference to FIG. 2, the phase sensor 36 also supplies DC voltage on line 41 to the motor starter 28 to supply the A/D convertor 48 and microprocessor 50 with DC voltage, and line 42 provides a path for a common circuit ground.

The signals on lines 38 and 40 are representative of the RMS values in each of the phases as will be further described herein. As such, the true RMS values can be extracted through a number of known methods in microprocessor 50. One such method is disclosed in U.S. Pat. No. 5,220,478 which is owned by the assignee of the present invention, and is incorporated herein by reference.

As is known, a control or microprocessor 50 can obtain the true RMS value of the current signals and monitor the associated values of each digitized signal, and when a given value exceeds some predetermined value, or the magnitudes differ by more than a predefined value, the microprocessor control 50 can produce a trip signal to contactor 30 of motor starter 28 to open contacts 22, 24, and 26, thereby disconnecting motor 10 from power source 14. In a thermal overload application, the RMS values for the currents are integrated to create a total heat accumulation value. After subtracting a cooling factor, a net heat accumulated value is produced which can then be compared to a set point. A trip signal is produced when the net heat exceeds the set point. It is understood that the A/D converter 48 and microprocessor 50 can be equivalently replaced with a microcontroller.

Figure 2:
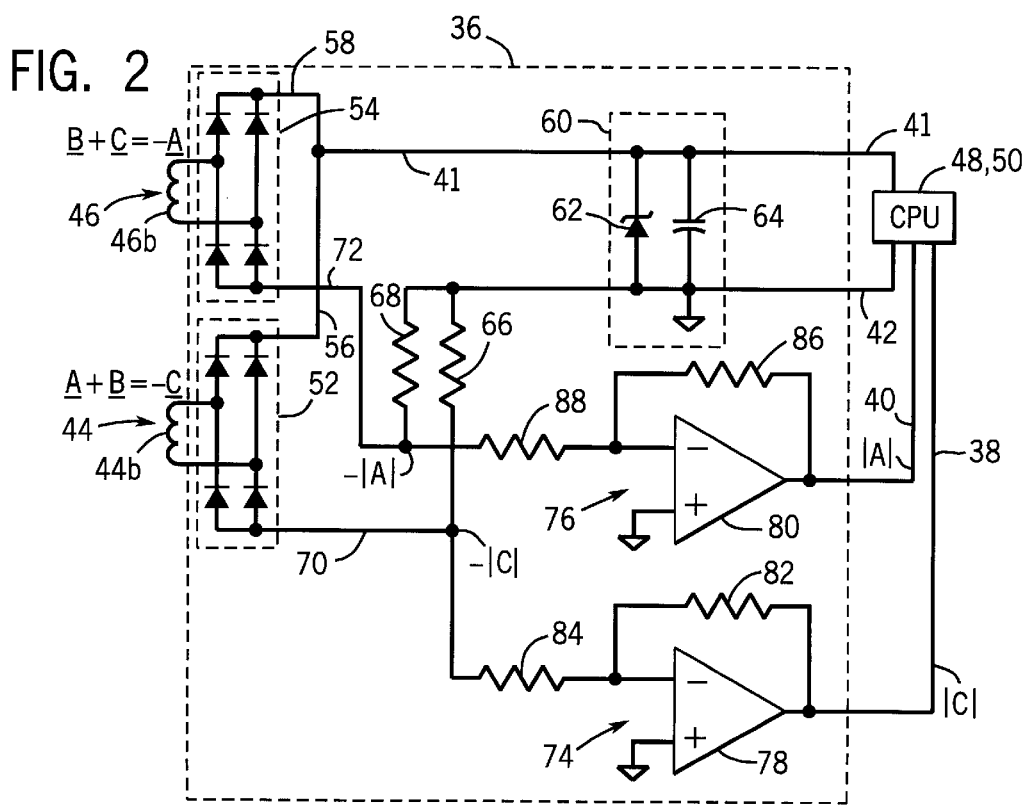
FIG. 2 is a circuit schematic of a portion of FIG. 1 in accordance with the present invention.

Referring to FIG. 2, a circuit schematic for the two CT configuration is shown in which current transformers 44 and 46, having primary windings 44b and 46b, are connected to the phase sensor with DC voltage supply 36 to provide DC voltage on line 41, a circuit common on line 42, and respective discrete signals representative of phase currents on lines 38 and 40. As previously described, the device for monitoring a polyphase distribution system has two current transformers 44 and 46 in operable association with each phase of the polyphase distribution system. The phase sensor 36 has two rectifiers 52 and 54, each in a typical four diode, full-wave rectifier configuration. The positive supply sides 56 and 58 of the rectifiers 52 and 54 are connected in common to a voltage regulator 60 on line 41. The voltage regulator 60 comprises a Zener diode 62, for regulating the DC power supply voltage, and a capacitor 64 to remove ripples and maintain a steady DC supply voltage. A CPU, including an A/D convertor 48 and a microprocessor 50, may be connected in common on the return path 42 with voltage regulator 60 through a pair of burden resistors 66 and 68 which are connected in a return path 70 and 72 of the rectifiers 52 and 54. A pair of inverters 74 and 76 are connected to the return paths 70 and 72, respectively, to invert the discrete signals representative of the phase currents in return paths 70 and 72, to provide positive respective discrete signals on lines 38 and 40 to the CPU. Inverters 74 and 76 include a pair of Norton amplifiers 78 and 80, which do not require a negative power supply, and a set of gain controlling resistors 82, 84 and 86, 88, respectively.

In a preferred embodiment, the gain of the inverters is set to provide a maximum voltage signal on lines 38 and 40 approximately equal to, or slightly less than, the DC supply voltage to utilize the fully capabilities of the A/D converter. In the present embodiment in which the voltage regulator regulates a 5.0 volt DC power supply, the gain resistors, along with burden resistors 66 and 68 and the number of windings 44b and 46b of the transformers 44 and 46, define the voltage level of signals 38 and 40 to preferably peak at close to 5.0 volts, but no more than 5.0 volts. Those skilled in the art will readily recognize that for a 3.3 volt microprocessor, the values of the gain resistors and the burden resistors will change according to the number of windings in the transformers, as well other characteristics of the transformers.

As shown in FIG. 1, current transformer 44 senses the current on phases A and B and current transformer 46 senses the current on phases B and C. As such, through vector addition in the transformers, the signals on return paths 70 and 72 are a combination of the currents through the respective transformers. For example, where transformer 44 senses phases A and B, return path 70 provides a voltage equivalent to a negative absolute value of phase C. The current transformer 46 senses the currents in phases B and C to provide a voltage value on return path 72 representative of the negative absolute value of the current in phase A. With a gain of negative unity in each inverter 74 and 76, the values on lines 38 and 40 are therefore the DC representation of the phase currents in phases C and A, respectively. Through known methods, the CPU can calculate the phase current for phase B by using the values for phases A and C. This arrangement provides signals on lines 38 and 40 to the CPU that are capable of providing true RMS current values for each phase of the polyphase distribution system.

The foregoing conclusion is based on the fact that under Kirchhoff's current law, the algebraic sum of the currents entering any node is zero. In other words, all current leaving the supply side of the rectifier must be equal to and return in the return path for that rectifier. For example, all current leaving rectifier 54 on supply side 58, must be equal in value, and return on return path 72 to the negative side of rectifier 54. Because the present invention splits the burden with respect to signals measured so that all the current from a particular current transformer would return individually to that current transformer, the RMS current of each individual phase can be accurately determined. The present invention accomplishes the foregoing, while also providing a DC voltage to form a self-powered circuit. The additional advantage of the configuration shown in FIGS. 1 and 2 is that it accomplishes the foregoing with the use of only two current transformers, thereby reducing the overall cost of the current transformers by one-third over conventional three phase sensors.

Figure 3:
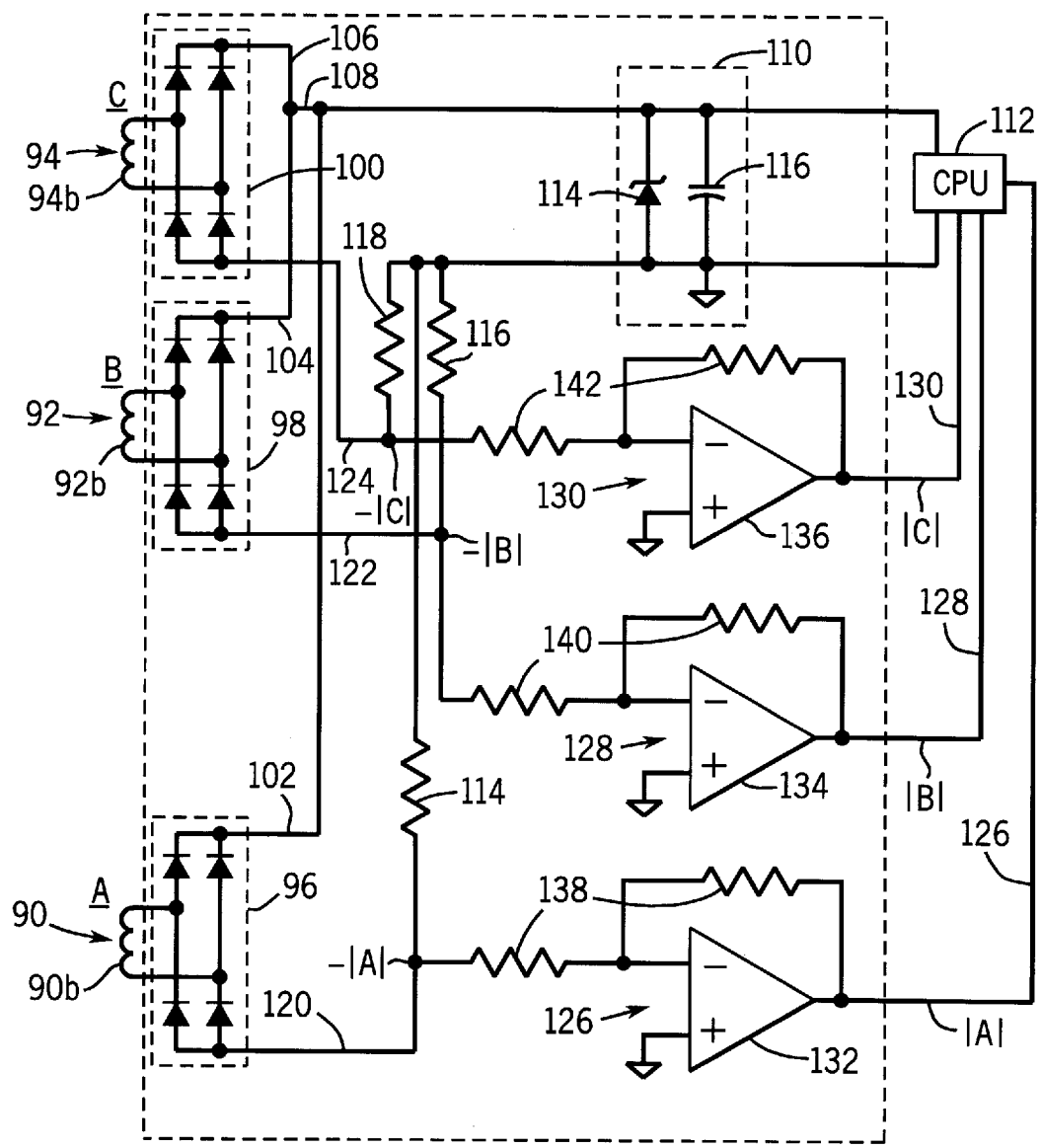
FIG. 3 is a circuit schematic, similar to that of FIG. 2, in accordance with another aspect of the present invention.

Accordingly, FIG. 3 shows an extension of the two CT configuration of FIG. 2 in which a separate CT is supplied for each phase. Because a discrete signal is produced for the current in each phase in this configuration, the calculations in the CPU are simplified, but at the expense of an additional CT. Unlike the configuration of FIG. 1 where each CT is in operable association with two phases, the three CT configuration of FIG. 3 has a CT in operable association with each phase of the polyphase distribution system. For example, current transformer 90 may be in operable association with phase A, current transformer 92 in operable association with phase B, and current transformer 94 in operable association with phase C, each for sensing a first, second, and third phase of the polyphase distribution system and producing a first, second, and third phase representation signal therefrom. The secondary windings 90b, 92b, and 94b are each connected across a respective full wave rectifier 96, 98, and 100 for rectifying the first, second, and third phase representation signals and for producing a DC power supply.

Similar to that of FIG. 2, each of the positive supply sides 102, 104, and 106 are connected at node 108 to voltage regulator 110 to provide a positive DC voltage supply to CPU 112 to provide a self-powered circuit. Voltage regulator 110 has Zener diode 114 and capacitor 116 and is connected in common with CPU 112 and with a separate burden resistor 114, 116, and 118 for each CT 90, 92, and 94, respectively. The voltage formed on the return paths 120, 122, and 124 is equivalent to the negative absolute value of the current in each phase. Inverters 126, 128, and 130 invert the signal on return lines 120, 122, and 124 to provide first (A), second (B), and third (C) discrete signals representative of the first (A), second (B), and third (C) phases of the polyphase distribution system on CPU input lines 126, 128, and 130, respectively. As previously described, each inverter has a Norton amplifier 132, 134, and 136 with gain controlling resistors 138, 140, and 142. In this manner, CPU 112 can monitor signals that are proportional to the RMS current through each phase in the polyphase distribution system.

Accordingly, the present invention includes a method of monitoring a polyphase distribution system while at the same time providing both DC power and respective discrete signals representative of the each phase current in the polyphase distribution system. The method includes the steps of sensing the AC electrical current in each phase of the polyphase distribution system and rectifying the AC electrical current to provide a DC power supply and at least two distinct respective discrete signals having representative characteristics of each phase current of the polyphase distribution system. The step of sensing the AC electrical currents can include sensing all three phases with two current sensors, or sensing each phase with a respective current transformer.

The method of the present invention can also include the step of processing two distinct respective discrete signals for monitoring the RMS characteristics for each phase of the polyphase distribution system. Applied to an overload relay as shown in FIG. 1, the method can include monitoring the discrete signals for irregularities and interrupting power in the polyphase distribution system in response to a monitored irregularity in any one phase of the system.

The present invention has been thoroughly described herein as applied to a motor, a motor starter, and a thermal overload. However, it is understood that the invention is well suited for use in any polyphase distribution system and is not limited to the application described herein and shown in the drawings.

The present invention has been described in terms of the preferred embodiment and it is recognized that equivalents, alternatives, and modifications, aside from those expressly stated, are possible and within the scope of the appending claims.

I claim:

1. A device for monitoring a polyphase distribution system comprising:

two current transformers in operable association with each phase of a polyphase distribution system, each current transformer coupled to two legs of the polyphase distribution system;

two rectifiers, each rectifier connected to a current transformer; and two burdens, each burden connected in a return path of each rectifier and providing respective discrete signals representative of phase current.

2. The device of claim 1 further comprising a voltage regulator connected to at least one rectifier and capable of supplying a positive D.C. power supply voltage from the polyphase distribution system.

3. The device of claim 2 further comprising:

a processor powered by the positive D.C. power supply voltage from the voltage regulator and receiving the respective discrete signals to produce an RMS signal representation for each phase of the polyphase distribution system.

4. The device of claim 3 further comprising:

at least two signal inverters, each connected between a respective burden and the processor.

5. The device of claim 2 wherein the voltage regulator is comprised of a zener diode and a capacitor connected in parallel with one another thereby forming a self-powered circuit.

6. The device of claim 1 wherein the rectifiers are full wave rectifiers.

7. The device of claim 1 wherein the burdens are discrete resistors.

8. A method of monitoring a polyphase distribution system and providing both D.C. power and respective discrete signals representative of each phase in the polyphase distribution system comprising the steps of:

sensing an AC electrical current in each phase of the polyphase distribution system with only two current transformers;

rectifying the AC electrical current for each phase;

providing a D.C. power supply from the rectified AC electrical current; and acquiring two discrete signals from the rectified AC electrical current having representative characteristics of each phase of a polyphase distribution system from each of the rectified AC electrical currents, and calculating a third discrete signal from the two discrete signals acquired, such that the method provides three discrete signals each representative of one phase of the polyphase distribution system.

9. The method of claim 8 wherein the step of sensing is further defined to sense three phases with two current sensors and further comprise the step of:

processing two distinct respective discrete signals for monitoring the RMS characteristics for each phase of the polyphase distribution system.

10. The method of claim 9 further comprising the steps of:

monitoring the three discrete signals for irregularities therein; and interrupting power in the polyphase distribution system in response to a monitored irregularity in any one phase of the polyphase distribution system.

11. The method of claim 8 wherein each phase of the polyphase distribution system is sensed and a distinct respective discrete signal is provided for each and the method further comprises the step of:

monitoring each distinct respective discrete signal for irregularities; and interrupting power in the polyphase distribution system in response to a monitored irregularity in any one phase of the polyphase distribution system.

12. A device for monitoring a polyphase distribution system comprising:

a first means for sensing first and second phases of the polyphase distribution system and producing a signal representation of a third phase;

a second means for sensing second and third phases of the polyphase distribution system and producing a signal representation of a first phase;

means for rectifying the first and third phase representation signals for producing a D.C. power supply; and means, in association with the means for sensing and means for rectifying, for producing distinct discrete signals representative of the first and third phase representation signals.

13. The device for claim 12 further comprising:

means for processing the discrete signals representative of the first and third phase representation signals and producing a discrete signal representative of the second phase of the polyphase distribution system, means for interrupting power in each phase of the polyphase distribution system in response to an irregularity in any of the discrete signal representations of the first, second and third phases.

* * * * *